US005626434A

United States Patent [19]
Cook

[11] Patent Number: 5,626,434
[45] Date of Patent: May 6, 1997

[54] CONNECTOR FOR VARIABLE-CURVATURE SPACEFRAME STRUCTURAL SYSTEM

[76] Inventor: Robert W. Cook, P.O. Box 41144, Tucson, Ariz. 85717

[21] Appl. No.: 517,062

[22] Filed: Aug. 21, 1995

[51] Int. Cl.⁶ .................................................. F16B 17/00
[52] U.S. Cl. .......................... 403/176; 52/655.1; 403/171; 403/218
[58] Field of Search ........................... 52/655.1; 403/171, 403/176, 217, 218

[56] References Cited

U.S. PATENT DOCUMENTS

| | | | |
|---|---|---|---|
| 3,323,820 | 6/1967 | Braccini | 403/218 |
| 4,313,687 | 2/1982 | Apeztegui et al. | 403/171 |
| 4,353,662 | 10/1982 | Du Chateau | 403/171 |
| 4,355,918 | 10/1982 | Van Vliet | 403/170 |
| 4,480,418 | 11/1984 | Ventrella | 52/648 |
| 4,567,707 | 2/1986 | Herman | 403/171 X |
| 4,606,669 | 8/1986 | DeBliquy | 403/170 |
| 4,624,090 | 11/1986 | Stienen | 52/648 |
| 4,646,504 | 3/1987 | Britvec | 52/648 |
| 4,951,440 | 8/1990 | Staeger | 403/171 X |
| 4,974,986 | 12/1990 | Cook | 403/171 X |
| 5,291,708 | 3/1994 | Johnson | 403/171 X |
| 5,356,234 | 10/1994 | Vangool | 403/171 X |

FOREIGN PATENT DOCUMENTS

| | | | |
|---|---|---|---|
| 1392220 | 4/1988 | U.S.S.R. | 403/171 |
| 2075589 | 11/1981 | United Kingdom | 403/56 |

*Primary Examiner*—Kenneth J. Dorner
*Assistant Examiner*—Andrea Chop

[57] ABSTRACT

An improved, economical spaceframe structural system capable of varying curvature is provided, wherein the ends of elongated frame members have fixedly attached headed ends which, in turn, fit into matching recesses in the connector joint. The connector comprises three, disk-like parts which nestle one on top of another on a common axis and which are held together with a single bolt. Each of the three connector parts share interior faces with another part and have matching recesses for joining the frame member ends. Other matching recessed formations on the interior faces of these parts permit the frame members to assume variable angles with respect to the common axis and, by this means, facilitate the property of variable curvature of the spaceframe structure. A minimum of two frame member ends have an improved T-shape which strengthens the connector under tensile forces, enhances the alignment of the framework during assembly, and helps the spaceframe resist racking after erection. An intermediate assembly nut and a location for its placement is provided in the interior of the connector, the use of which, significantly simplifies the assembly process into fewer, more manageable stages. The connector parts and frame member ends have simple forms and are economical to cast or forge. Differently designed frame member ends are provided which adapt and attach to a wide range of frame member materials.

12 Claims, 5 Drawing Sheets

Fig. 1

CONNECTOR FOR VARIABLE-CURVATURE SPACEFRAME STRUCTURAL SYSTEM

FIELD OF THE INVENTION

This improved invention relates, generally, to frame support structures and, more particularly, to connector and frame elements which, when joined, permit economical construction of curved and planar spaceframe structures suitable for common building uses.

BACKGROUND OF THE INVENTION

Spaceframe structures have long been known and applied to special architectural and engineering problems. Spaceframes are hyperstatic support structures. They have evolved out of the quest to better utilize the tensile properties of materials in order to achieve higher performance load-carrying capacities in frame structures. These improved structural characteristics are achieved through the high repetition of a basic, triangulated, self-bracing geometry expressed in a three dimensional truss-like framework.

The main focus of improved spaceframe design is the design of the connecting means; usually a nodal arrangement which joins together the ends of elongated frame members and which provides for the transfer and distribution of loads in the realized structure.

Contributing to the cost and limited application of spaceframes are two basic types of problems exhibited by previous spaceframe connectors: (A) the connectors are comprised of many parts, first to be manufactured and later be simultaneously handled in an assembly procedure; and (B) the connector requires a sequence of many assembly steps during field construction. Typically, the sequence cannot be optimized due to inherent characteristics of the connector design itself. These problems are further compounded by the highly repetitive geometry which demands close manufacturing tolerances of all parts and which contributes to the time consuming process of frame alignment and connector adjustments during assembly.

Another major limitation of previous approaches to spaceframe design is the lack of variability of possible shapes of spaceframe structures. In order for common building practice to more fully benefit from spaceframe technology, a connecting means should be capable of producing a range of space-enclosing shapes such as curved vaults and upright cylinders. Previous spaceframe connectors require geometric or structural modifications in order to be used for curved spaceframe applications. In addition, these connectors require separate manufacture for each change of angular curvature and each change in structural specification.

OBJECT OF THE INVENTION

The object of this invention is to provide a significant improvement of the spaceframe connector and the spaceframe system claimed in my previous U.S. Pat. No. 4,974,986. The improved spaceframe connector and spaceframe, including the connectors, is capable of producing varying curvatures, not excluding planes, and which can be better introduced into common construction practice by virtue of its improved design properties. These improved properties substantially include: (A) strengthened, yet simple structural design and (B) improved optimization of the assembly sequence in field construction.

SUMMARY OF THE INVENTION

The present improved invention includes prefabricated elongated frame members with headed ends which fit into matching recessed sockets in the connector joint. In the preferred embodiment, the connector comprises three parts which nestle one on top of another on a common axis and which are held together with a single bolt fastening means. Each of the three connector parts has at least one interior surface which mates with a corresponding interior surface of another adjacent connector part. Each mating pair of interior surfaces have matching recesses which in pairs form sockets for receiving the frame member ends. In the preferred embodiment, the spaceframe structural system includes both outer chordal frame members and inner web frame members. A minimum of two chordal frame member ends and corresponding pairs of matching recesses are T-shaped and located between and on the interior surfaces of the first and second parts. All sockets adjoin other formations on the interior faces of the connector parts which permit the frame members to assume variable angles with respect to the common axis. In this way, the connector facilitates the property of variable curvature of the spaceframe structure. The T-shaped frame member ends add significant strength to the performance of the connector and restricts the variable angles of the frame members having T-shaped ends to a single-planar hinging action. This single planar hinging action of the chordal members corresponds to the precise geometry of variable curvature spaceframes. The T-shape contributes significant additional strength by preventing pop-out of the frame member ends from the connector assembly under heavy loading conditions. Further, the T-shape prevents the spaceframe sub-assemblies from racking out of alignment during the assembly process.

All connector parts and frame member ends are simply designed and are without complex formations such as threaded areas. All of these elements can be cast or forged in simple two-part molds. Depending on structural requirements, these elements may be manufactured out of a range of materials from metals to structural composites. Accordingly, any appropriate casting or forging method may be used in their manufacture.

Assembly of the spaceframe structure is simplified by the improved design of the connector. An intermediate assembly nut and a location for its use is provided in the interior of the connector between the first and second part. This intermediate nut permits the assembly process to be simplified into three, more manageable stages. Through these stages, the connector elements are progressively assembled: in the first two stages, to capture and hold the frame members in place and, in the third stage, to align and fix the spaceframe structure as a whole. Location of the intermediate assembly nut between the first and second part permits the web frame members to be gathered and joined together in the first stage and then in the second stage, permits the outer chordal frame members to be joined together to the first stage. This assembly sequence is enabled by the improved location of the cavity housing the intermediate assembly nut. From experience and analysis, this improved assembly sequence is the most efficient and least costly compared to the sequence permitted by my previous invention, U.S. Pat. No. 4,974,986.

DETAILED DESCRIPTION OF THE INVENTION

Figure 1:
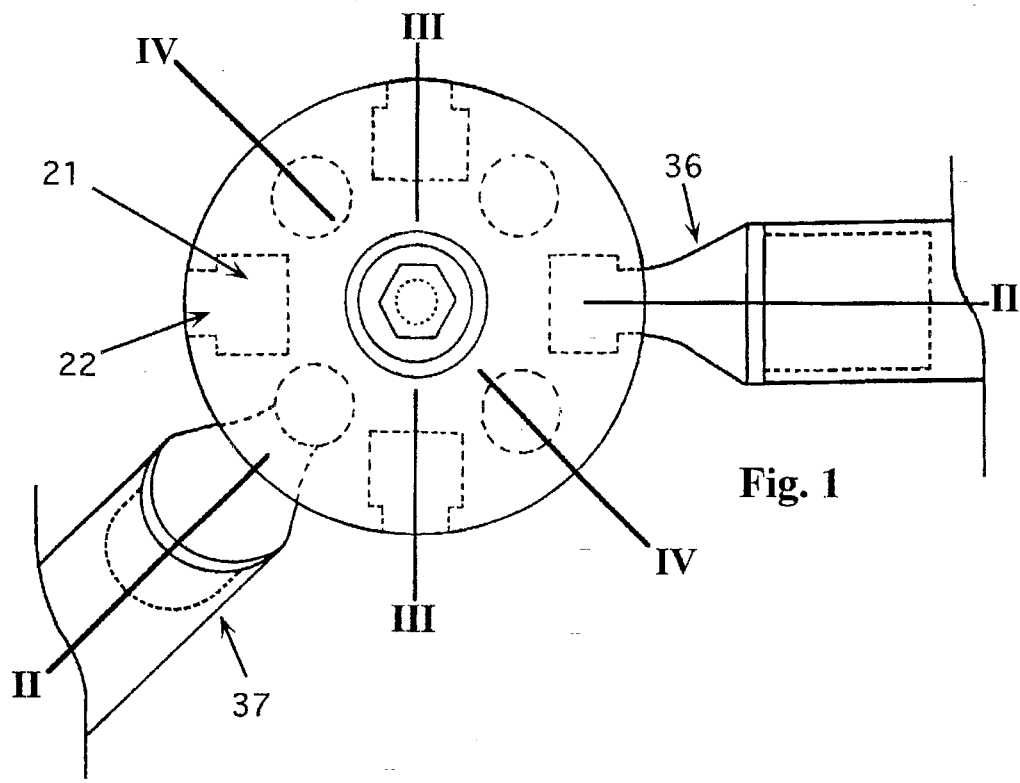
FIG. 1 shows a top view of the connector assembly. Section II—II indicates a cross-section which includes one T-shaped chord frame member end and socket and one web frame member ball end and socket. Section III—III indicates a cross-section which includes two T-shaped chord frame member end and socket sets. Section IV—IV indicates a cross-section which includes two web frame member ball end and socket sets.
Figure 2:
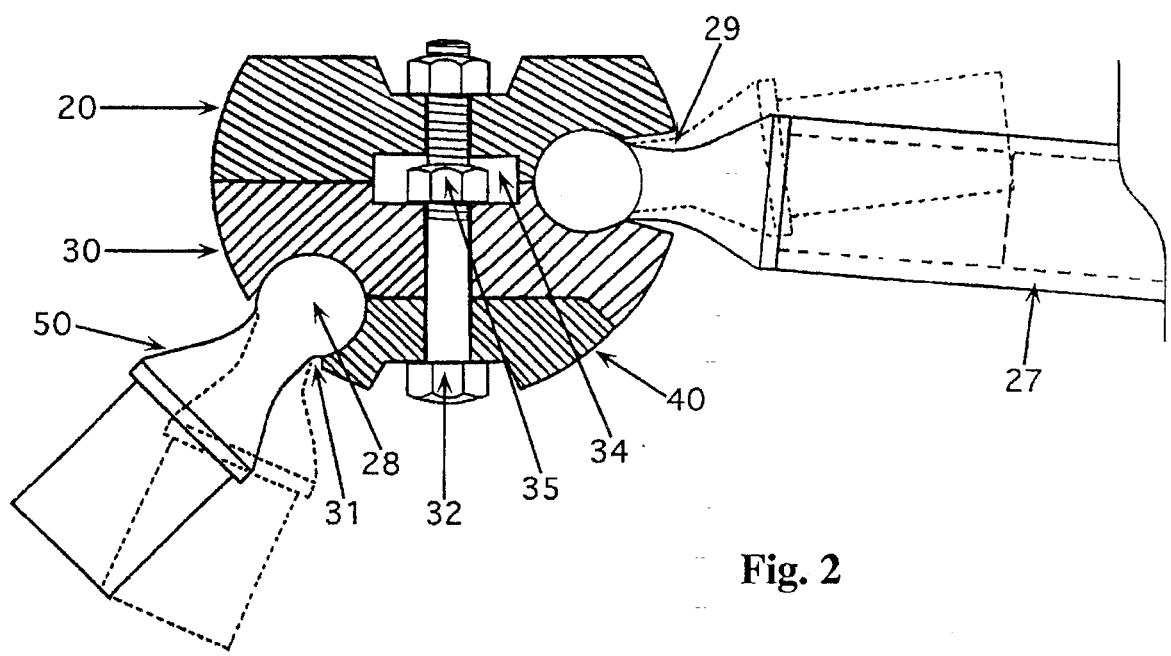
FIG. 2 is a sectional view taken along Section II—II and showing three connector parts holding frame member ends with a single fastening bolt and two nuts.
Figure 3:
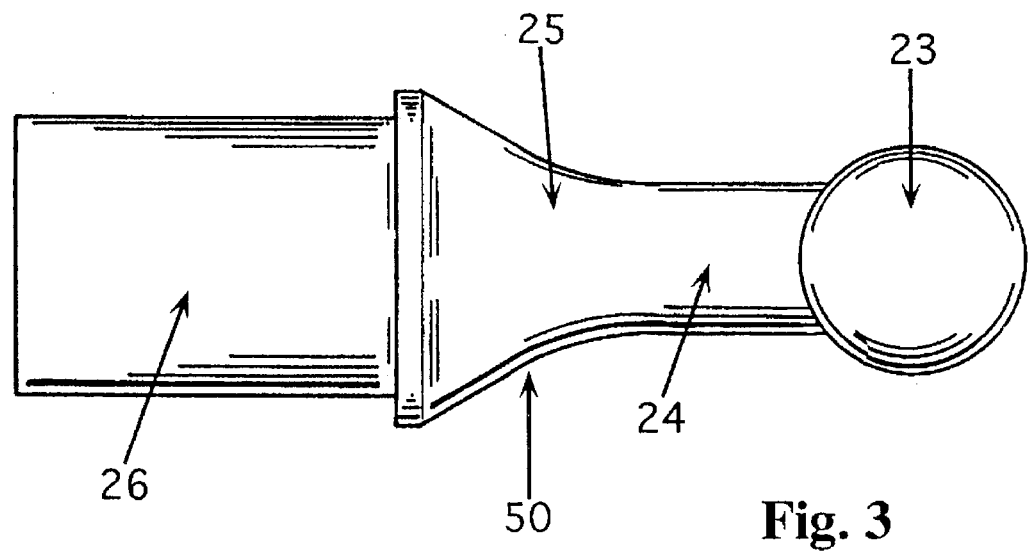
FIG. 3 shows the different portions of a frame member end.

In accordance with the present improved invention, a minimum plurality of joint connector parts is provided. This minimum plurality may be two, three or four parts depending on the intended configuration of the spaceframe structure. In the preferred embodiment of this invention, three parts (20,30,40) nestle one part on another on a common axis as shown in FIG. 2. The interior face of each part which mates with the interior face of another part includes recesses which mate to form sockets for fixing the positions of the frame member ends. Each frame member end (50) is comprised of: a headed end (23) which is either T-shaped or ball-shaped; a substantially cylindrical neck (24); a substantially conical base (25); and an adapting formation (26) for attachment to an elongated frame element as shown in FIG. 3. In the preferred embodiment of this invention, a minimum of two frame member ends have T-shaped ends for each completed connector assembly.

According to the object of this invention, a connector is provided which permits a plurality of connected frame members to variably position themselves in order to produce different angularly curved spaceframe structures. The recessed socket formations in the connector may be located at or near the exterior of the connector as shown in (28) or may adjoin other recessed formations (22) which extend outwardly to the exterior surface of the connector.. These other recessed formations receive the cylindrically-shaped necks (24) of the member ends. These other recessed formations also may be elongated (29) or enlarged (31) to permit the frame members to assume different angles with respect to the axis of the connector. The substantially spherical or T-shape headed frame member ends and corresponding sockets in combination with the elongated or enlarged recessed formations for receiving the necks, permit a flexible hinging action of the frame member ends while loosely tightened in the connector assembly. This hinging action is stopped when all self bracing frame members are also positioned in like manner in the connector assemblies. The diameter of the socket formations and the width of the elongated cylindrical recesses are substantially the same as the respective dimensions of the positive formations of the frame member ends. In the preferred embodiment, the positive and negative formations of the connector joint elements fit tight when torque-tightened to predetermined specifications.

In further accordance with the object of this invention, the connector parts and frame member ends are assembled together in a simplified, three-stage sequence. In the preferred embodiment, the fastening means is a single, threaded bolt (32) with two fastening nuts. The shank of the bolt passes through holes (41) provided in the center of each part along the axis of the connector. The simplified three stage assembly process is made possible by the provision of a recessed cavity (34) large enough for an intermediate assembly nut (35) to be placed and tightened and which is located in matching interior faces of the first and second parts (20,30) as shown in FIG. 2. The intermediate assembly nut permits the previously cumbersome process of positioning together all frame member ends at a node, to be divided into fewer, more manageable steps.

Figure 6:
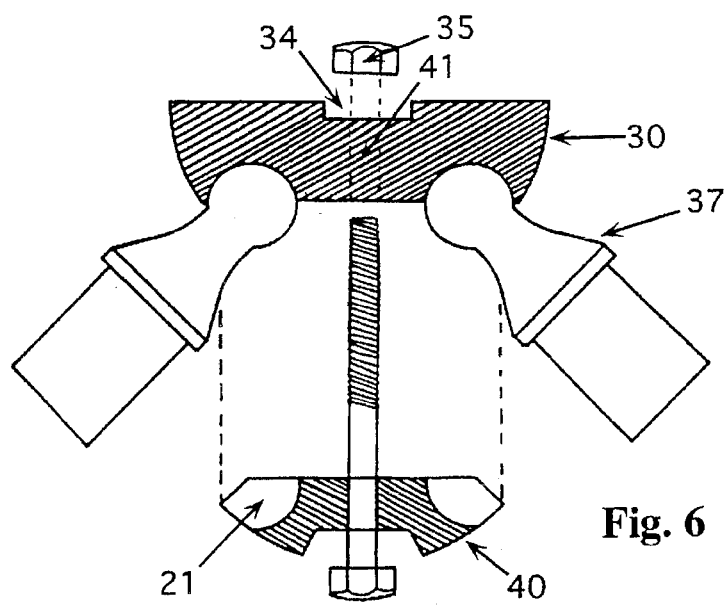
FIG. 6 is a sectional view taken along Section IV—IV and showing the first stage of the assembly sequence.

The first stage of the assembly sequence includes gathering the ball ends of the inner web spaceframe members (37) and locating them in the spherical recesses between the second (30) and third (40) connector parts as shown in FIG. 6. The fastening bolt is then placed through holes in these two connector parts and mated with the intermediate assembly nut (35) and subsequently tightened to a loose fit such that, at minimum, the ball ends cannot escape from the connector assembly. Preferably, the intermediate assembly nut is tightened such that the second and third parts nearly touch each other.

Figure 7:
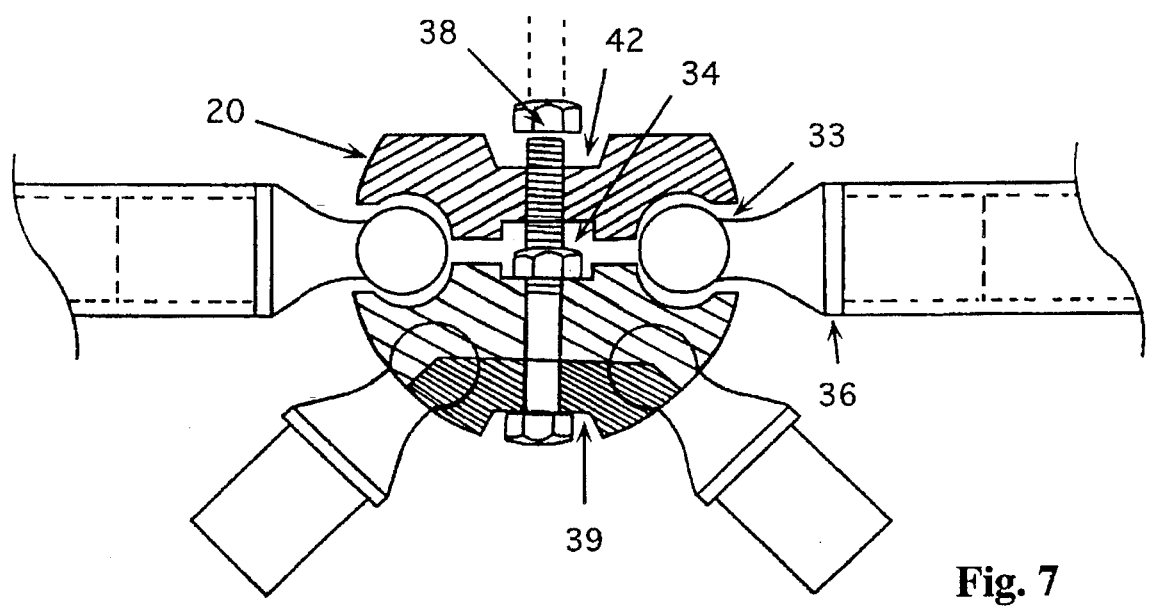
FIG. 7 is a multi-sectional view showing the second stage of the assembly sequence. The section showing the first and second parts is taken along Section III—III. The section showing the assembly of the second and third parts completed in the first stage is taken along Section IV—IV.
Figure 8:
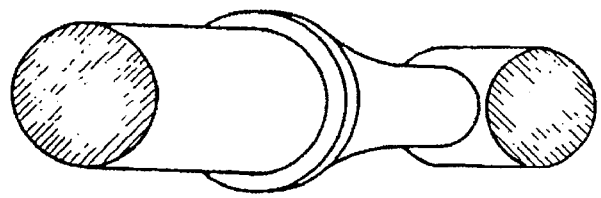
FIG. 8 shows a T-shaped frame member end suitable for attaching to pipe or tubing stock with a cylindrical adapting portion designed to fit the inside diameter of the frame material.
Figure 9:
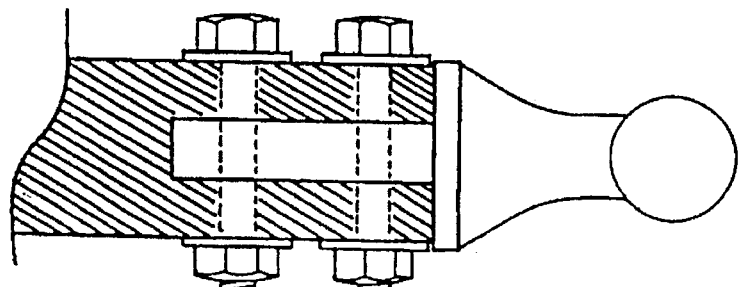
FIG. 9 shows a T-shaped frame member end designed such that the adapting portion of the member end fits and attaches in a rabbeted end section of a wood frame member.
Figure 10:
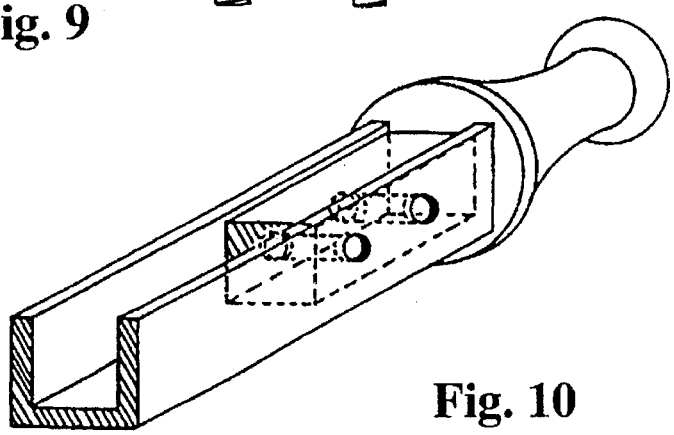
FIG. 10 shows a frame member end designed to attach to channel stock frame materials.
Figure 11:
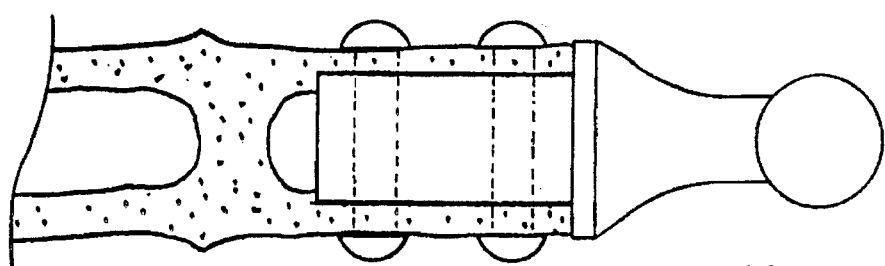
FIG. 11 shows a T-shaped frame member end designed to fit into the bored end of a bamboo frame member and designed to attach with rivets.

The second stage involves gathering the T-shaped ends of the outer chord frame members (36) and joining them in like manner to the previous assembly (FIG. 6) with the first connector part (20) and a second nut (38) as shown in FIG. 7. The headed end and socket design facilitates the nestling of the elements together (33). This final fastening nut (38) should also be tightened to a loose fit. In the preferred embodiment, these first and second stages are applied in a progressive sequence to each connector assembly in the spaceframe structure.

The third stage of the assembly process includes the torque-tightening of each connector assembly in a pattern of graduated steps. This final stage permits all of the frame member ends to self-align in the connector assemblies while the spaceframe structure as a whole is simultaneously aligned and tightened to a specified torque rating with the final fastening nut (38). At this stage, the intermediate assembly nut (35) no longer serves a purpose, yet remains freely residing in the recessed cavity (34). This cavity (34) which accepts the intermediate assembly nut (35) is sufficiently large to permit complete tightening of the connector assembly without the position of the intermediate nut restricting the torque-tightening of the assembly with the final nut (38). The improved T-shaped frame member ends prevent the spaceframe structure from substantially racking before final tightening of all connector assemblies. The T-shaped frame member ends contribute to significantly improved alignment and assembly time.

In accordance with one embodiment of this invention, the outer faces of the bolt head and final fastening nut can be located below the exterior surface of the connector after assembly, as shown in FIG. 7. The head of the fastening bolt can rest in a recessed formation, concentric with the axial hole, which opens out (39) on the surface of the first connector part. This hollow recess can be cylindrically or conically shaped (39). Similarly, the final fastening nut (38) can rest in a hollow recess (42), concentric with the axial hole on the surface of the third connector part.

Accordingly, the completed connector assembly thus forms a single, solid spaceframe node whereby the interior formations can provide optimally-shaped surfaces of mutual contact for the rapid resolution of distributed loads. In applications of this invention where additional structural integrity is required, welds or adhesives can be applied to these surfaces of the connector elements to more rigidly secure their fixed positions.

Figure 4:
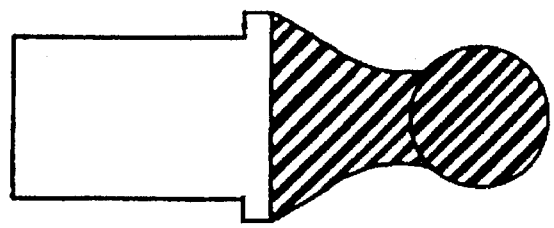
FIG. 4 shows a cross-section of a flexible, T-shaped, rubber-headed frame member end.
Figure 5:
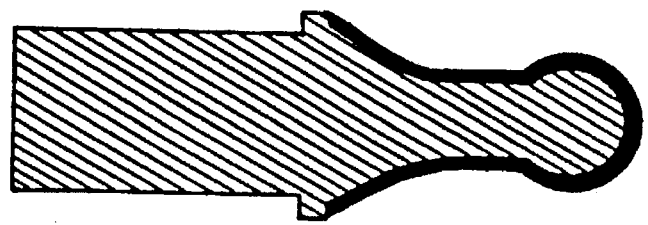
FIG. 5 shows a cross-section of a flexible, rubber-covered frame member end.

Alternatively, a safe structure may be defined as being capable of resonating with external perturbations such as the case with earthquakes. In this type of application, flexible rubber-headed (FIG. 4) or rubber-covered (FIG. 5) frame member ends can be used to optimize structural design.

In addition to the aforementioned, other positive and negative formations, not shown in the drawings, can also be located at the interior faces of the connector parts. For example, a pattern of keys and matching grooves can be located on matching interior connector part faces. These keys and grooves help to guide and align the connector elements during assembly and help to resist any twisting tendency of the connector parts under loading conditions.

In spaceframe structures generally, and in vaulted spaceframe structures particularly, engineering experience shows that greater axial loads are exerted on the chordal frame members compared with the loads exerted on the web frame members. Accordingly in this improved invention, the frame member ends of the chordal members are T-shaped to resist the higher loads, especially tensile forces. Also in this invention, the location of the socket formations for the chordal (36) frame member ends can be radially closer to the fastening means bolt than the sockets for the web (37) members ends. Further, the web (37) member ball ends and their respective spherical recesses can be located in the connector joint such that the cylindrical necks (24) are positioned completely outside of the assembled connector as shown in FIG. 7.

Figure 12:
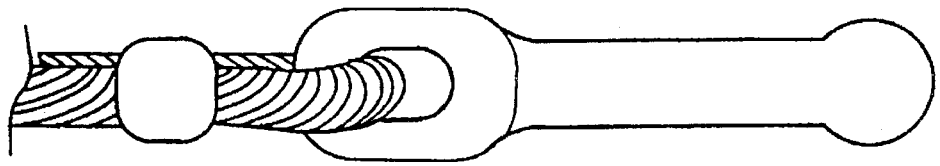
FIG. 12 shows a frame member end designed to accept a cable connection.

In further accordance with the object of the present invention, different frame member ends are provided which adapt to a wide range of materials. A wide selection of appropriate materials for the fabrication of frame members contributes to optimum economy and lower construction costs of spaceframe structures; FIG. 8, 9, 10, 11, and 12 show different frame member ends designed for different frame member materials: pipe or tubing (FIG. 8); solid wood or structural plywood (FIG. 9); channels or angles, (FIG. 10), bamboo (FIG. 11); and cables (FIG. 12). Depending on both the structural requirements of the intended spaceframe and the materials chosen for use in the manufacture of the spaceframe elements, different attachment means may be used to fix the frame member end (50) to the frame member (27). A suggested list includes: pins, bolts and nuts, rivets, welds, adhesives, friction fittings, and crimped joints.

The highly repetitive geometry of spaceframe structures requires that close tolerances be adhered to in the manufacture of the spaceframe elements. High quality control in both the manufacture of the simple parts and the fabrication of the frame elements of this invention contributes to greater ease of assembly in field construction. In addition, all matching elements to be connected together can be color-coded in order to expedite construction and reduce the necessary skill level for field assembly.

Figure 13:
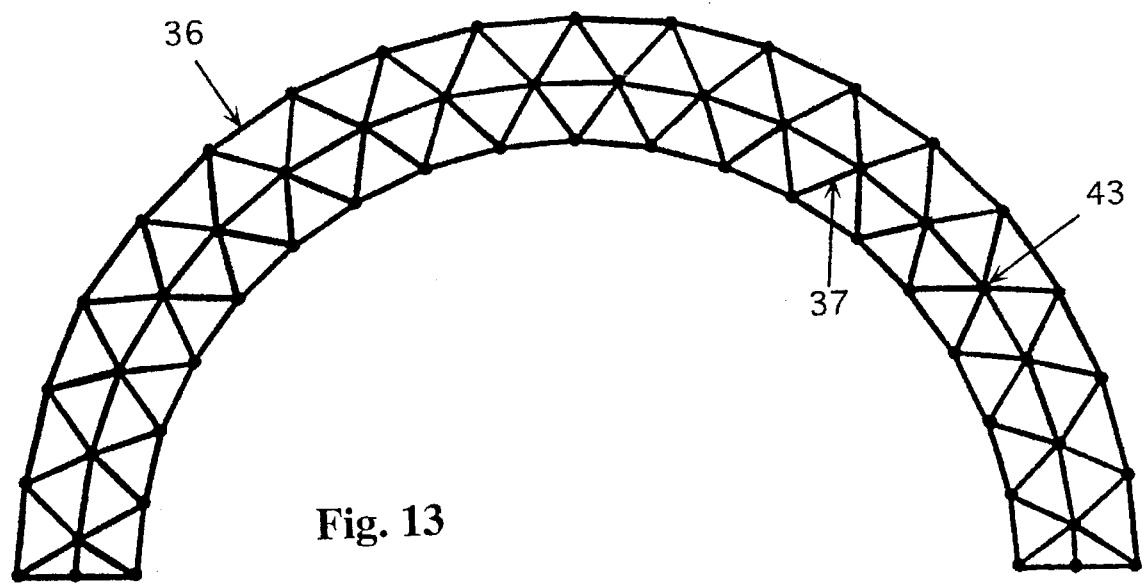
FIG. 13 shows the end view of a double-layer vaulted spaceframe structure.
Figure 14:
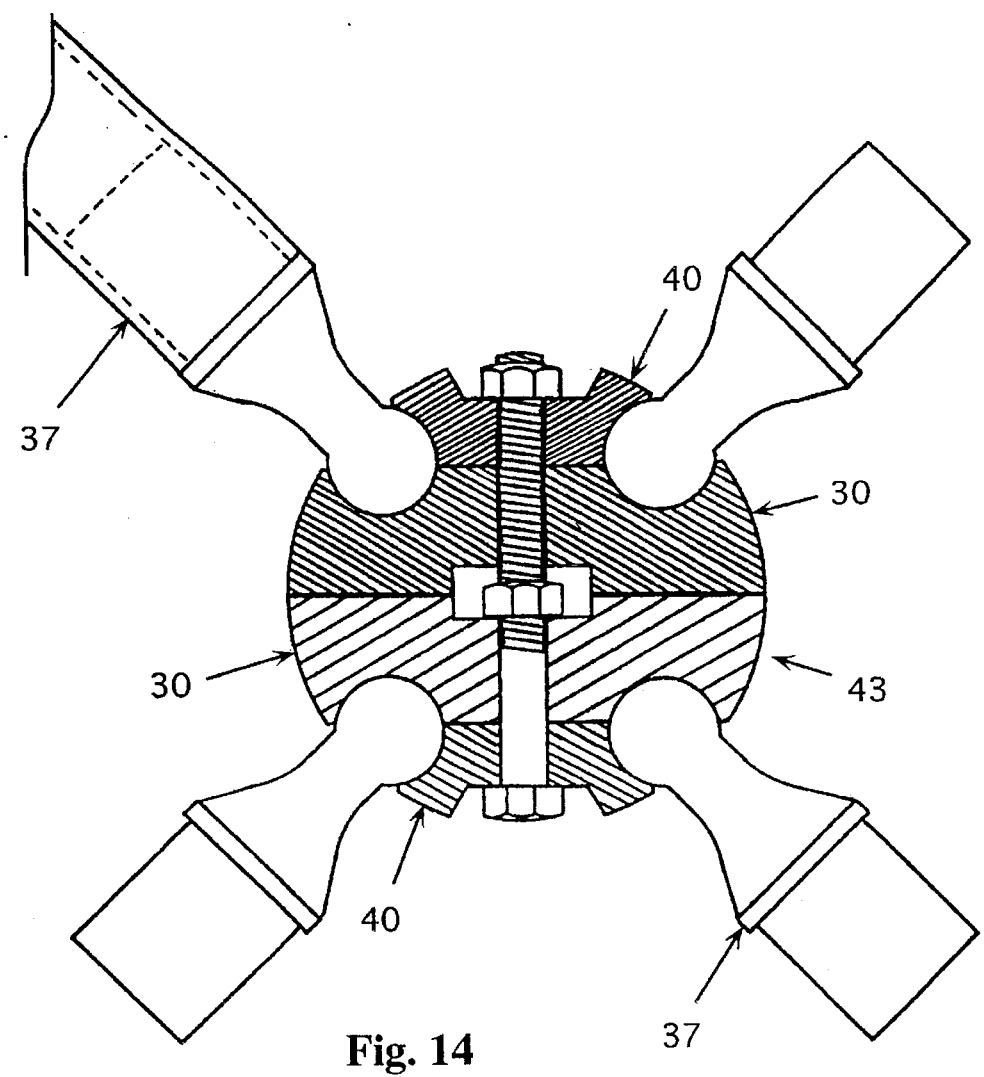
FIG. 14 is a sectional view of a middle connector assembly used in a multi-layer spaceframe structure.

According to the present invention, in cases where significantly increased structural strength is required, additional layers of spaceframe structure can be constructed using the same frame elements and the same connector parts. FIG. 13 illustrates an end view of a double-layer vaulted spaceframe of the present invention. The middle joint connectors (43) connect two sets of web members (one set above and one set below) and one set of chord members making a total of twelve frame elements connected at a single node. This middle connector is comprised of two sets of connector parts (30 and 40) with one set nestling on the other inverted set, as shown in FIG. 14. FIG. 14 also shows that the connector shown in FIG. 2 can be more simply constructed by eliminating part 20 and replacing it with a second part 30, invertedly stacked on the first part 30.

Thus, by the foregoing disclosure, the present improved spaceframe invention demonstrates high flexibility of application and high economy of use by providing a highly structural, simply designed, economical to manufacture and assemble spaceframe structural system. By incorporating the features described herein, this invention discloses an improved spaceframe connector and spaceframe including the connectors which is capable of wide-ranging applications in common building construction. The drawings and embodiments of this present invention are illustrative and should not be construed to limit the full range of possible variations which fall within the scope of the invention.

I claim:

1. In a spaceframe structural system of the type comprising:

a plurality of elongated frame members having headed frame member ends, said headed frame member ends having a headed end portion, a substantially cylindrical neck adjoining said end portion, a substantially conical base adjoining said neck, and an adapting formation adjoining said base and adapted for attachment to said elongated frame members;

a connector assembly having matching sockets for receiving said frame member ends, said connector assembly comprising first, second and third disk-like parts which are stacked one on the other on a common axis, each of said parts having a central hole therethrough, a single bolt fastening means extending through said holes for securing said parts together, said parts having interior faces each which mate with and abut against the interior face of another part, said mating faces having a plurality of matching recesses which in pairs form said sockets for joining first and second sets of said frame member ends, said parts having other matched recessed formations adjoining said sockets and which extend to the exterior of said connector assembly, said other recessed formations including means which permit said frame members to assume variable angles with respect to said common axis, the improvement wherein:

said first and second parts have a minimum of two said pairs of substantially T-shaped matching recesses on said mating faces for receiving a minimum of two substantially T-shaped headed frame member ends, said T-shaped headed frame member ends have a substantially cylindrical-shaped end portion, the axis of said substantially cylindrical shaped end portion being perpendicularly aligned to the axis of said adjoining cylindrical neck and, by this means, producing said T-shape, said T-shaped headed frame member ends located in said T-shaped matching recesses and said other matched recessed formations restricting the freedom of said variable angles to a single-planar hinging action, said mating interior faces of said first and second parts defining a cavity concentric with said common axis and through which said bolt extends, an intermediate assembly nut threaded on said bolt and located in said cavity, said intermediate assembly nut holding together said first set of frame member ends between said second and third parts, a final fastening nut threaded on said bolt and bearing against the outer surface of said first part so that said second set of frame member ends is held between said first and second parts.

2. The system of claim 1, wherein said headed frame member ends are separate elements and have an adapting portion for rigid attachment to said elongated frame members, said frame members being tubular, said adapting portion being cylindrically-shaped and having a diameter substantially equal to the inside diameter of said tubular frame member material and which is fixed to said frame member.

3. The system of claim 1, in which said frame members are wooden and have a rabbeted end slot and wherein said headed frame member ends are separate elements and each have an adapting and attaching portion, said portion having a bar-section shape and an attachment means and being dimensionally formed to fit the rabbeted end slot in said wood frame member.

4. The system of claim 1, in which said frame members are channel-shaped in cross-section and wherein said headed frame member ends are separate elements and each have an adapting and attaching portion, said portion having a key-section shape and an attachment means and being dimensionally formed to fit the inside of said channel of frame member material.

5. The system of claim 1, in which said frame members are bamboo and have bored-out end sections and wherein said headed frame member ends are separate elements and each have an adapting and attaching portion, said portion being cylindrically-shaped and having a diameter substantially equal to the diameter of said bored-out end section of said bamboo frame member.

6. The system of claim 1, in which said frame members are bamboo and have bored-out end sections and wherein said headed frame member ends are separate elements and each have an adapting and attaching portion, said portion being cylindrically-shaped and having a diameter substantially equal to the diameter of said bored-out end section of said bamboo frame member, said cylindrical portion having an attachment means to fixedly connect said bamboo frame member to said frame member end.

7. The system of claim 1, in which said frame members comprise cables and wherein said headed frame member ends are separate elements and each have an adapting and attaching portion, said portion having a loop shape suitable for holding said cable attached to said frame member.

8. The system of claim 1, wherein said connector assembly comprises first and second sets of said second and third parts, said second set replacing said first part, and which is invertedly stacked on said first set of said second and third parts on said common axis, providing sockets which receive a third set of frame member ends, said bolt and nuts securing together all four parts of said connector assembly, said connector assembly permitting construction of multi-layer spaceframe structures.

9. The system of claim 1, wherein said frame member ends comprise a flexible, rubber-like material so that a stable, yet less rigid, spaceframe structure is produced and whereby the property of an elastic, resonating response to loading conditions in said structure is facilitated.

10. In a spaceframe connector of the type comprising:

a plurality of parts which are stacked one on the other on a common axis, said parts having interior faces each of which mates and abuts against the interior face of another part, said mating faces having a plurality of matching recesses which, in pairs, form sockets for joining headed ends of elongated frame members, said headed frame member ends having a headed end portion, a substantially cylindrical neck adjoining said end portion, a substantially conical base adjoining said neck, and an adapting formation adjoined to said base and adapted for attachment to said elongated frame members, said parts having other matched recessed formations adjoining said sockets and which extend to the exterior of said connector, said other recessed formations substantially including circumferentially enlarged recesses which permit the longitudinal axes of said frame members to vary with respect to each other and to said common axis and, by this means, permit angular freedom through a hinging action of said elongated frame members, and fastening means extending parallel to said axis and securing said parts together, the improvement wherein:

a minimum of two said pairs of matching recesses have a substantially T-shape to receive substantially T-shaped headed ends of a minimum of two said elongated frame members, said T-shaped headed frame member ends have a substantially cylindrical shaped end portion, the axis of said substantially cylindrical shaped end portion being perpendicularly aligned to the axis of said adjoining cylindrical neck and, by this means, producing said T-shape, said T-shaped headed frame member ends being located in said T-shaped matching recesses and said other matched recessed formations of the connector, and by this means, restricting said angular freedom to a single-planar hinging action, said single-planar hinging action being stopped in each direction by said other matched recessed formations.

11. The connector of claim 10, wherein said connector comprises a first, second and third part, said fastening means is a single bolt and two nuts and wherein said interior faces of said first and second parts have a recessed cavity concentric with said axis, one of said nuts being an intermediate assembly nut disposed in said cavity and threaded on said bolt, said intermediate assembly nut being adapted for holding together one set of said headed frame member ends disposed in the sockets between said second and third parts, the other of said nuts being a final fastening nut threaded on said bolt and bearing against the outer surface of said first part so that another set of said headed frame member ends can be held between said first and second parts.

12. The connector of claim 10, wherein said connector comprises a first, second and third part, said fastening means is a single bolt and two nuts and wherein said interior faces of said first and second parts have a recessed cavity concentric with said axis, one of said nuts being an intermediate assembly nut disposed in said cavity and threaded on said bolt, said intermediate assembly nut being adapted for holding together one set of said headed frame member ends disposed in the sockets between said second and third parts, the other of said nuts being a final fastening nut threaded on said bolt and bearing against the outer surface of said first part so that another set of said headed frame member ends can be held between said first and second parts, wherein said connector comprises first and second sets of said second and third parts, said second set replacing said first part and which is invertedly stacked on said first set of said second and third parts on said axis, providing sockets which receive a third set of frame member ends, said bolt and said final fastening nut securing together all four parts of the connector assembly, said connector assembly permitting construction of multi-layer spaceframe structures.

* * * * *